United States Patent [19]

Nijenhuis

[11] 4,091,235
[45] May 23, 1978

[54] PRINTER AND CONTROL CIRCUIT THEREFOR

[75] Inventor: Emil Johan Nijenhuis, Voorburg, Netherlands

[73] Assignee: De Staat Der Nederlanden, Te Dezen Vertegenwoordigd Door De Directeur-Generaal Der Posterijen, Telegrafie En Telefonie, The Hague, Netherlands

[21] Appl. No.: 783,408

[22] Filed: Mar. 31, 1977

[30] Foreign Application Priority Data

Apr. 1, 1976    Netherlands .......................... 7603408

[51] Int. Cl.$^2$ ........................... H04L 21/00; B41J 9/10
[52] U.S. Cl. ................................. 178/23 R; 101/93.02; 178/30
[58] Field of Search ............... 101/93.02, 93.29, 93.43; 197/12, 13, 14; 178/30, 4, 17 R, 23 R, 24, 25, 27, 30, 33 R, 33 A, 36, 74; 317/152, 155.5; 361/152, 153, 154, 245, 246, 166, 167, 168, 169

[56] References Cited

U.S. PATENT DOCUMENTS

| | | | |
|---|---|---|---|
| 3,741,113 | 6/1973 | Mako et al. ........................ | 101/93.02 |
| 3,952,153 | 4/1976 | Nijenhuis et al. ...................... | 178/30 |

Primary Examiner—Thomas A. Robinson
Attorney, Agent, or Firm—Hugh Adam Kirk

[57] ABSTRACT

A printer, comprising a printing element which, when in operating position, is placed in a magnetic field, and is connected to a secondary winding of a transformer. This transformer has two additional secondary windings and two primary windings which are connected to a circuit so arranged that after a start pulse, two current pulses of opposite directions are successively supplied to the transformer of which only the second pulse effects movement of the printing element. The two primary windings are each connected to an amplifier, each of which supplies one of the current pulses. The input of the circuit and the amplifiers are coupled in such a way that the start pulse controls one of the amplifiers which in turn, through the two additional secondary windings and a blocking circuit, controls the other amplifier to produce the second pulse. This magnetizing of the iron in the transformer first in one direction and then in the other enables a greater change of flux to be realized with a relatively weak magnetizing current.

7 Claims, 9 Drawing Figures

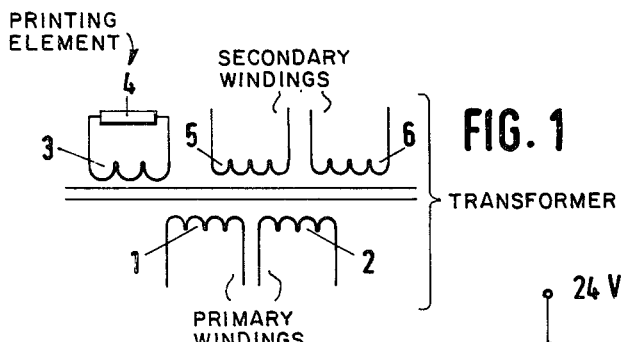
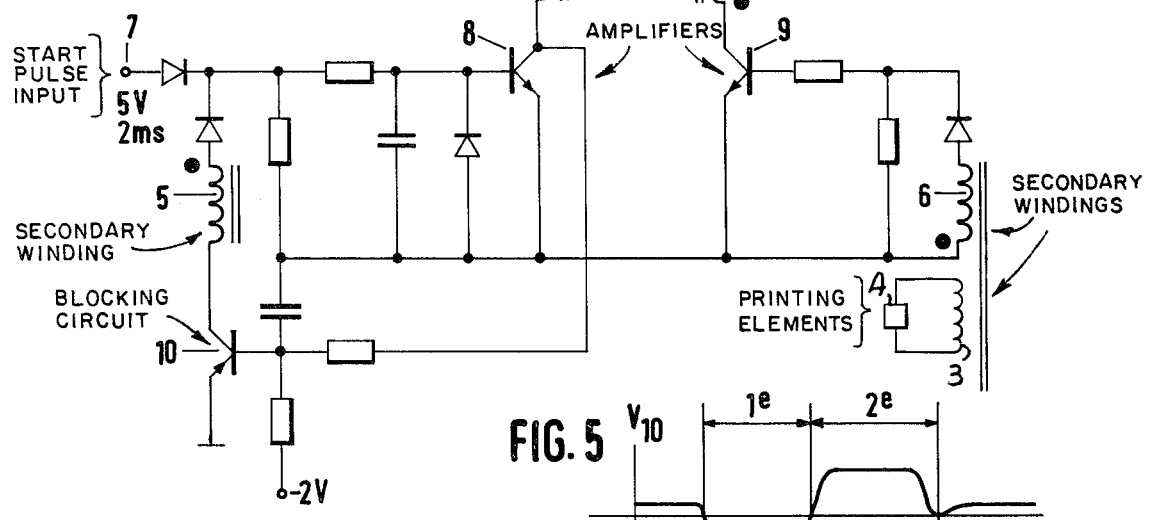
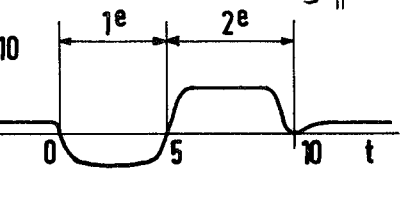
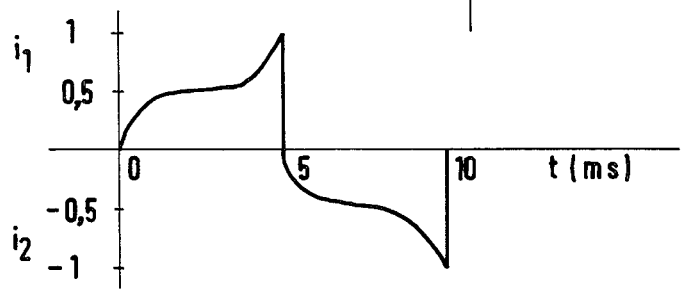
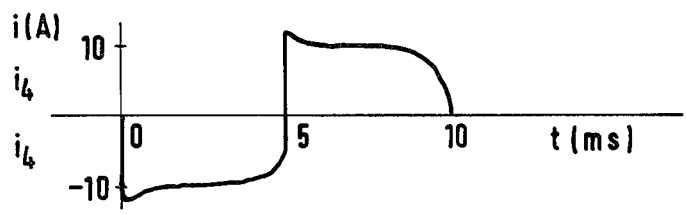

PRINTER AND CONTROL CIRCUIT THEREFOR

BACKGROUND OF THE INVENTION

A printer of the type involved herein is shown in applicant's joint U.S. Pat. No. 3,952,153, issued Apr. 20, 1976. With printers of this type the iron of the transformer has so far always been magnetized in the same direction. In order to prevent the operating point of the magnetic field of the transformer from being too much in the upper part of the B-H-curve, the iron core can be provided with an air gap. In order to obtain the then required relatively strong magnetizing current, so that a secondary current of the order of 10 A can be supplied during 5 ms, many turns are needed and the transformer has to be rather large. As the printer according to the above mentioned patent with seven printing elements, called rulers or bars, requires seven transformers, weight and dimensions play a very important part, particularly in the case of a supply apparatus for a cheap subscriber's set of small dimensions.

SUMMARY OF THE INVENTION

The present invention provides a solution for the problem posed because of the fact that the transformer is provided with additional windings which are connected to a circuit so arranged that after a start pulse, two current pulses of opposite directions are successively supplied to the transformer wherein the second pulse effects the printing movement. This transformer has two primary windings, each connected to an amplifier and each capable of supplying one of the double current pulses. The input of the circuit and the amplifiers are coupled in such a way that the start pulse controls one of the amplifiers, which in turn through two additional secondary windings in the transformer and a blocking circuit controls the other amplifier to produce the second pulse. This magnetizing the iron in the transformer first in the one direction and then in the other enables a greater change of flux to be realized with a relatively weak magnetizing current.

The printing element (the ruler or bar) according to the applicant's above mentioned patent is supported by springs which are preferably rather slack and which keep the ruler in its normal position pressed against stops. When operating according to this invention, the pressure against the stops is increased by the first current pulse, after which the second current pulse causes the ruler or bar to be struck quickly against the printing area. Then if during the backward movement of the ruler, a fresh or new start pulse presents itself to the printer circuit, this new start pulse causes the ruler first to be moved more quickly back toward the stops, after which the second pulse generated by the circuit of this invention from this new start pulse, causes the ruler to strike a second time against the printing area. In consequence of this, the force of the stroke against the printing area is always equal, because each start pulse produces a double pulse, the first pulse of which resets or urges the printer element against its stop and then the second pulse of the double pulse moves the printer element into its printing position or area.

An embodiment with a transformer with only one primary winding, instead of two as disclosed herein, can only be realized by a more complicated circuit, and particularly because the direction of current during the second pulse has to be opposite to the direction of current during the first pulse in a double pulse.

A preferred embodiment of the circuit for one transformer according to this invention with two additional secondary windings, is that each secondary winding is connected in parallel to the control input circuit of one of the amplifiers, in such a way that the function of the start pulse can be continued by one of the additional secondary windings, and that the saturation peak at the end of the first current pulse is utilized for starting the second current pulse by means of the other additional secondary winding.

In order to prevent that the saturation peak at the end of the second double current pulse will start automatically the first current pulse, a blocking circuit is connected in series with an additional secondary winding for the first current pulse, which blocking circuit is controlled by an output of the amplifier for the first current pulse in such a way that blocking takes place except during the first current pulse.

BRIEF DESCRIPTION OF THE VIEWS

The above mentioned and other features, objects and advantages, and a manner of attaining them are described more specifically below by reference to an embodiment of this invention shown in the accompanying drawings wherein:

FIG. 1 is a schematic wiring diagram of a transformer with five windings;

FIG. 2 is a circuit diagram according to this invention connecting the transformer windings shown in FIG. 1;

FIG. 3 is a pulse time diagram for the sum of the primary currents produced in the circuit of FIG. 2;

FIG. 4 is a pulse time diagram for the current in a printing element produced in the circuit of FIG. 2;

FIG. 5 is a pulse time diagram of a blocking voltage produced in the circuit of FIG. 2;

DETAILED DESCRIPTION OF A PREFERRED EMBODIMENT

Figure 6:
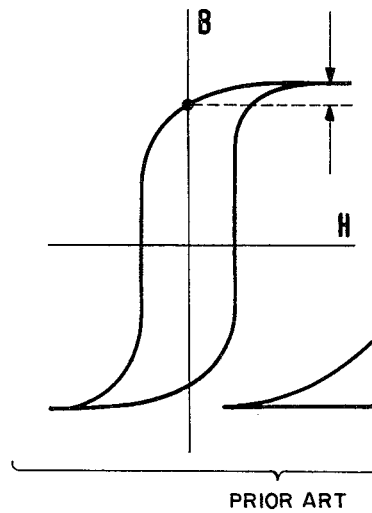
FIGS. 6 and 7 are diagrams of prior art hysteresis loops for magnets without and with air gaps respectively.

The transformer according to FIG. 1 comprises two primary windings 1 and 2, a secondary winding 3 to which a printing element bar, or ruler 4, is conductively connected, and two additional secondary windings 5 and 6.

The circuit in FIG. 2 showing the connection of the two primary windings 1 and 2 and the two additional secondary windings 5 and 6, comprises an input 7 for a start pulse, an amplifier 8 for the first current pulse, a second amplifier 9 for the second current pulse, and a blocking circuit 10.

Figure 8:
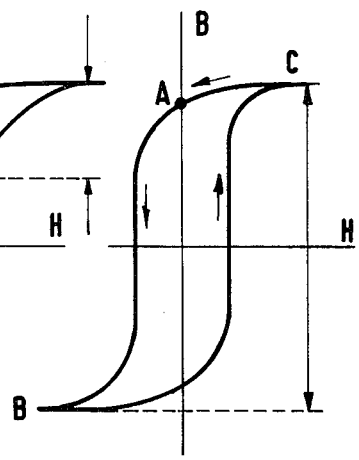
FIG. 8 is a diagram of a hysteresis loop for a magnet without an air gap as is employed in a device according to this invention.

The first amplifier 8 is made conductive by a start pulse of 2 ms at the input 7. Beginning at the remanence point A (see FIG. 8) the field strength in the transformer iron goes through part of the hysteresis loop toward the point B, since the output voltage of the amplifier 8 is negative. In consequence of this the blocking circuit 10 is conductive (FIG. 5) and a voltage is produced in the additional secondary winding 5, which functions to continue the start pulse until the transformer iron gets saturated point B (FIG. 8). In consequence of this the voltage across the primary winding 1 decreases, and the output voltage of the amplifier 8 becomes positive, so that the circuit 10 blocks the flow of current in the secondary winding 5.

Due to the current peak at the end of the first current pulse (see FIG. 3) as a result of the saturation of the transformer's iron, the second additional secondary winding 6 has attained such a voltage that the amplifier 9 has become conductive. In consequence of this the primary winding 2 starts the second current pulse and maintains it until the hysteresis loop (FIG. 8) passes from point B to point C, that is from the one saturation point to the other. A graph of the consecutive current pulses flowing in the primary windings 1 and 2 is represented in the diagrams in FIG. 3. The peak at the end of the second pulse cannot start the first current pulse, because the positive control voltage V10 (FIG. 5) blocks the blocking circuit 10. The voltage across the winding 2 decreases, in consequence of which the control voltage of the winding 6 becomes too low and the amplifier 9 terminates the current pulse. At the termination of this second current pulse, the field strength of the transformer iron proceeds from the saturation point C to the remanence point A (FIG. 8), so that the hysteresis loop has been entirely gone through during the two current pulses.

FIG. 4 represents the current through the ruler or printing element 4 (FIG. 1) plotted against the time in milli-seconds.

Figure 9:
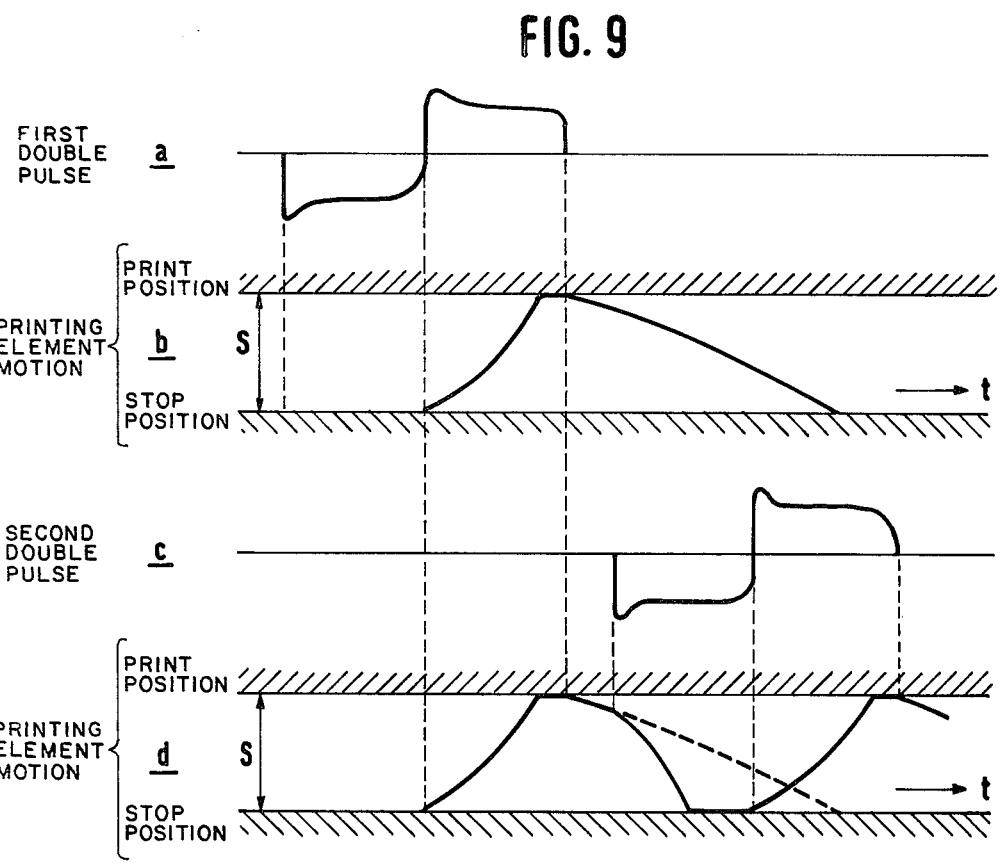
FIG. 9 shows time aligned pulse and path diagrams corresponding to the two successive input pulses in the circuit of FIG. 2 and the motion of the printing element in FIG. 1.

FIG. 9 represents at a a double pulse according to the diagram in FIG. 4, and beneath it at b a path-time diagram for a ruler or printing element 4 which covers the distance s from the bottom or stop position to the top or printing position, and back again to the stop position. The movement of the element 4, then starts at the second pulse when the ruler 4 quickly strikes against the printing area or position and moves backward under the influence of the slack springs toward the stop position (see above mentioned patent). Then, if during this backward movement, a new or second start or double pulse (c) presents itself, the backward movement is accelerated (d) by the opposite first pulse of this new double pulse. In this way a quick operation of the ruler 4 with a constant striking force is ensured.

FIG. 6 represents a hysteresis loop for a transformer without an air gap, the difference in field strength between the normal state (remanence point) and the off-normal state (saturation point) being indicated between the arrows.

Figure 7:
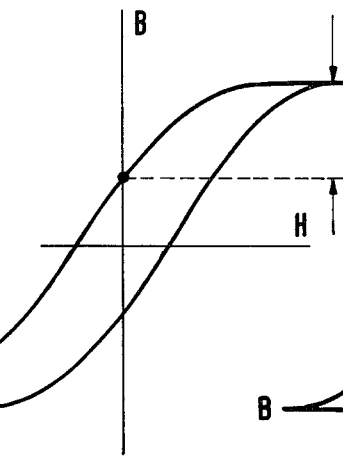

FIG. 7 represents a hysteresis loop for a transformer with an air gap; which air gap considerably improves the difference in field strength between the normal state and the off-normal state.

These two graphs in FIGS. 6 and 7 compared with the graph in FIG. 8 shows that a transformer without air gap when controlled by means of a double pulse according to the invention, produced a maximum difference in field strength, namely that existing between the two states of saturation.

Thus, the volume and the weight of the transformer according to the invention can be considerably reduced as compared with those of the prior art devices.

While there is described above the principles of this invention in connection with specific apparatus, it is to be clearly understood that this description is made only by way of example and not as a limitation to the scope of this invention.

What I claim is:

1. Printer, comprising: a printing element which, when in operating position, is placed in a magnetic field, and which can carry currents; a transformer connected to said element and having two primary windings; a circuit having two amplifiers, one connected to each of said primary windings, whereby, after a start pulse, two current pulses of opposite directions are generated by said amplifiers which are successively supplied to the transformer, the second pulse effecting the printing movement of said element; the input of the circuit and the amplifiers being coupled one to another in such a way that the start pulse controls one of the amplifiers, which in its turn controls the other amplifier.

2. A printer according to claim 1, wherein said transformer comprises two additional secondary windings, each connected in parallel to the control input circuit of one of the amplifiers, in such a way that the function of the start pulse can be continued by one of the additional secondary windings, and that the saturation peak at the end of the first current pulse is utilized for starting the second current pulse by means of the other additional secondary winding.

3. A printer according to claim 2, including a blocking circuit connected in series to the additional secondary winding, which is connected in parallel to the start pulse input, which blocking circuit is controlled by an output of the amplifier for the first current pulse, in such a way that blocking takes place except during the first current pulse.

4. A device for controlling a printer comprising:
   (A) a printer element,
   (B) a magnetic transformer having a secondary winding connected to said printer element, and two primary windings, and
   (C) a control circuit connected to said two primary windings comprising:
      (a) two amplifier circuits, one connected to each of said two primary windings,
      (b) a pulse input connected to one of said amplifiers whereby said one amplifier controls the other amplifier to produce two successive opposite current pulses, the first of which moves said printer element in a non-printing direction, and the second of which moves said printer element into its printing direction.

5. A device according to claim 4 wherein said transformer also includes two additional secondary windings which are connected in said control circuit, one of which secondary windings is connected to said pulse input and the other secondary winding being connected to the said other amplifier.

6. A device according to claim 5 including a blocking circuit connected to one of said secondary windings and controlled by one of said primary windings for operation during the second current pulse.

7. A device for controlling a printer comprising:
   (A) a printer element,
   (B) a magnetic transformer having a secondary winding connected to said printer element, two additional secondary windings, and two primary windings, and
   (C) a control circuit connected to said two additional secondary and said two primary windings comprising:
      (a) two amplifier circuits, one connected to each of said two primary windings, (b) a blocking circuit connected to one of said secondary windings and controlled by one of said primary windings, and
(c) a pulse input connected to one of said secondary windings and to one of said amplifiers, and said other secondary winding being connected to the other of said amplifiers, whereby one amplifier circuit controls the other to produce two successive opposite current pulses, the first of which pulses moves said printer element in a non-printing direction and the second of which pulses moves said printer element into its printing position, when said pulses are successively applied to said secondary winding connected to said printer element.

* * * * *